(12) United States Patent
Jepsen

(10) Patent No.: US 8,462,144 B2
(45) Date of Patent: Jun. 11, 2013

(54) TRIPLE MODE LIQUID CRYSTAL DISPLAY

(75) Inventor: Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 480 days.

(21) Appl. No.: 12/510,498

(22) Filed: Jul. 28, 2009

(65) Prior Publication Data

US 2010/0020054 A1 Jan. 28, 2010

Related U.S. Application Data

(60) Provisional application No. 61/084,021, filed on Jul. 28, 2008, provisional application No. 61/084,018, filed on Jul. 28, 2008, provisional application No. 61/091,416, filed on Aug. 24, 2008.

(51) Int. Cl.
*G09G 5/00* (2006.01)

(52) U.S. Cl.
USPC ........... 345/208; 345/204; 345/205; 345/207; 345/209; 345/211

(58) Field of Classification Search
USPC 345/30, 87–102, 204–212, 690, 694; 349/33, 349/65, 74, 96, 114, 117, 171; 359/35, 279
See application file for complete search history.

(56) References Cited

U.S. PATENT DOCUMENTS

| | | | | |
|---|---|---|---|---|
| 4,672,457 A * | 6/1987 | Hyatt | ............................. | 348/761 |
| 5,398,041 A * | 3/1995 | Hyatt | ............................. | 345/88 |
| 5,432,526 A * | 7/1995 | Hyatt | ............................. | 345/87 |
| 5,748,828 A | 5/1998 | Steiner et al. | | |
| 5,870,164 A * | 2/1999 | Lu et al. | ......................... | 349/180 |
| 5,952,680 A * | 9/1999 | Strite | ............................. | 257/88 |
| 6,341,002 B1 | 1/2002 | Shimizu et al. | | |
| 6,674,420 B2 * | 1/2004 | Matsueda et al. | ............... | 345/87 |
| 6,831,662 B1 * | 12/2004 | Lum et al. | ..................... | 345/698 |

(Continued)

FOREIGN PATENT DOCUMENTS

CN 1599879 A 3/2005
CN 101187751 A 5/2008

(Continued)

OTHER PUBLICATIONS

JP2007-223991detail description; Nagai; Horoshi; Transflective LCD unit; 2007; NLT Technology, Ltd.*

(Continued)

*Primary Examiner* — Prabodh M Dharia
(74) *Attorney, Agent, or Firm* — Hickman Palermo Truong Becker Bingham Wong LLP

(57) ABSTRACT

A pixel in a plurality of pixels in an LCD of a system comprises a transmissive part, a reflective part and a latched driving circuit. The driving circuit comprises a transmissive section comprising a transmissive data input coupled to the transmissive part of the pixel, and is configured to drive a transmissive data value from the transmissive data input and to set the transmissive part to a transmissive display state based on the transmissive data value; a reflective section comprising a reflective data input (independent of the transmissive data input) coupled to the reflective part of the pixel, and is configured to drive a reflective data value from the reflective data input and to set the reflective part to a reflective display state based on the reflective data value.

36 Claims, 7 Drawing Sheets

U.S. PATENT DOCUMENTS

| | | | |
|---|---|---|---|
| 6,920,359 B2 * | 7/2005 | Meadows et al. | 607/59 |
| 6,930,664 B2 | 8/2005 | Kim et al. | |
| 7,008,409 B2 | 3/2006 | Spiezio et al. | |
| 7,196,766 B2 | 3/2007 | Yang et al. | |
| 7,248,315 B2 | 7/2007 | Arai et al. | |
| 7,358,943 B2 | 4/2008 | Asao | |
| 7,388,635 B2 | 6/2008 | Aoki | |
| 7,463,327 B2 | 12/2008 | Tasaka et al. | |
| 7,692,672 B2 * | 4/2010 | Jones et al. | 345/694 |
| 7,876,406 B2 * | 1/2011 | Nagai et al. | 349/114 |
| 8,111,360 B2 * | 2/2012 | Nagai et al. | 349/117 |
| 2002/0003521 A1 * | 1/2002 | Matsueda et al. | 345/89 |
| 2002/0060657 A1 * | 5/2002 | Matsueda et al. | 345/89 |
| 2002/0145688 A1 | 10/2002 | Sekiguchi | |
| 2004/0201560 A1 | 10/2004 | Shen et al. | |
| 2004/0201814 A1 | 10/2004 | Yamamoto | |
| 2004/0252092 A1 | 12/2004 | Roosendaal | |
| 2006/0007194 A1 * | 1/2006 | Verschueren et al. | 345/204 |
| 2006/0044240 A1 | 3/2006 | Takizawa et al. | |
| 2006/0119770 A1 | 6/2006 | Ting et al. | |
| 2007/0046606 A1 | 3/2007 | Kim et al. | |
| 2007/0085804 A1 * | 4/2007 | Tajiri | 345/98 |
| 2007/0164953 A1 | 7/2007 | Huang et al. | |
| 2007/0242014 A1 * | 10/2007 | Lee et al. | 345/88 |
| 2007/0242197 A1 | 10/2007 | Watson et al. | |
| 2007/0268418 A1 * | 11/2007 | Lin et al. | 349/38 |
| 2008/0030656 A1 | 2/2008 | Watson et al. | |
| 2008/0055519 A1 | 3/2008 | Battersby et al. | |
| 2008/0068523 A1 * | 3/2008 | Mitsui et al. | 349/37 |
| 2008/0074592 A1 | 3/2008 | Araki et al. | |
| 2008/0100601 A1 | 5/2008 | Moon et al. | |
| 2008/0117346 A1 | 5/2008 | Jepsen | |
| 2008/0170018 A1 * | 7/2008 | Jones et al. | 345/89 |
| 2008/0225189 A1 | 9/2008 | Yang et al. | |
| 2008/0239178 A1 * | 10/2008 | Nagai et al. | 349/33 |
| 2008/0284719 A1 * | 11/2008 | Yoshida | 345/102 |
| 2009/0009447 A1 * | 1/2009 | Naka et al. | 345/87 |
| 2009/0059107 A1 * | 3/2009 | Nagai et al. | 349/33 |
| 2009/0090604 A1 * | 4/2009 | Srinivasan et al. | 200/308 |
| 2010/0231614 A1 | 9/2010 | Vieri et al. | |

FOREIGN PATENT DOCUMENTS

| | | |
|---|---|---|
| JP | 2003-248221 A | 9/2003 |
| JP | 2004031005 A | 1/2004 |
| JP | 2004-045757 A | 2/2004 |
| JP | 2004-163893 A | 6/2004 |
| JP | 2004-279765 A | 10/2004 |
| JP | 2004310005 A | 11/2004 |
| JP | 2007041572 A | 2/2007 |
| JP | 2008046329 A | 2/2008 |
| JP | 2008052259 A | 3/2008 |
| JP | 2008052259 A | 3/2008 |
| TW | 1258037 B | 7/2006 |
| WO | WO 2008/063171 A2 | 5/2008 |

OTHER PUBLICATIONS

JP2007-223991 drawings; Nagai; Horoshi; Transflective LCD unit; 2007; NLT Technology, Ltd.*

JP2007-223991 Bib; Nagai; Horoshi; Transflective LCD unit; 2007; NLT Technology, Ltd.*

International Searching Authority, "International Search Report and Written Opinion", application No. PCT/US2009/050787, dated Feb. 17, 2010, 10 pages.

Current Claims, application No. PCT/US2009/050787, 4 pages, Feb. 2010.

International Searching Authority, "International Search Report and Written Opinion", application No. PCT/US2009/051946, dated Mar. 3, 2010, 15 pages.

Current Claims, application No. PCT/US2009/051946, 11 pages, Mar. 2010.

International Searching Authority, "International Search Report and Written Opinion", application No. PCT/US2009/051950, dated Mar. 15, 2010, 10 pages.

Current Claims, application No. PCT/US2009/051950, 6 pages, Mar. 2010.

Wu, S.T., et al., "Mixed-Mode Twisted Nematic Liquid Crystal Cells for Reflective Displays", Applied Physics Letters, vol. 68, published Jan. 1996, 3.

Wright, et al., "Resolution and Legibility: A comparison of TFTLCDs and CRTs", SID Digest, 1999, 4 pages.

Yoshitake, et al., "The Relationship between Pixel Density and Readability on Computer Displays—Effectiveness of an Anti-Aliased Front on a High Density LCD", SID Digest, 2003, 4 pages.

U.S. Appl. No. 12/503,793, filed Jul. 15, 2009, Notice of Allowance, Correspondence Mailing Date May 10, 2010.

TIPLO, "Office Action", in application No. 098123922, dated Dec. 22, 2012, 5 pages.

Current Claims in application No. 098123922, dated Dec. 2012, 2 pages.

The State Intellectual Property Office of the People's Reublic of China, "First Office Action", in application No. 200980129831.6, dated Dec. 28, 2012, 12 pages.

Current Claims in China application No. 200980129831.6, dated Dec. 2012, 9 pages.

Office Action in application No. 10-2011-7004896, applicant: Pixel Qi Corporation, dated Oct. 10, 2012, 10 pages.

Current Claims in application No. 10-2011-7004896, Pixel Qi Corporation, dated Oct. 10, 2012, 13 pages.

International Searching Authority, "International Search Report and Written Opinion", application No. PCT/US2009/066838, dated Jul. 2, 2010, 13 pages.

Current Claims, application No. PCT/US2009/066838, 6 pages.

Japan Patent Office, "Notice of Grounds for Rejection", in application No. 2011-521241, dated Jan. 17, 2013, 5 pages.

Current Claims in application No. 2011-521241, dated Jan. 2013, 4 pages.

* cited by examiner

TRIPLE MODE LIQUID CRYSTAL DISPLAY

BENEFIT CLAIM

This application claims the benefit, under 35 U.S.C. 119 (e), of prior provisional application 61/084,021, filed Jul. 28, 2008, prior provisional application 61/084,018, filed Jul. 28, 2008, and prior provisional application 61/091,416, filed Aug. 24, 2008, the entire contents of which are hereby incorporated by reference for all purposes as if fully set forth herein.

CROSS REFERENCE TO RELATED APPLICATIONS

This application is related to U.S. patent application Ser. No. 12/503,793, filed Jul. 15, 2009, the entire contents of which are hereby incorporated by reference for all purposes as if fully disclosed herein.

TECHNICAL FIELD

The present disclosure relates, in general, to a display. More specifically, the disclosure relates to Liquid Crystal Displays (LCDs).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a transflective LCD, both reflected ambient light and transmitted back light may contribute to the color as represented in a pixel. The color produced by the reflected portion of the pixel may produce a desaturated color, while the transmitted portion of the pixel may provide a color of fidelity. The overall color from both the reflected portion and the transmitted portion may still be a color of good fidelity with enhanced brightness, resolution and readability. However, when the ambient light is strong (e.g., in bright room light or outside under the sun), the desaturated color from the reflected portion may be so strong as to affect the overall fidelity of the color produced by both the reflected portion and the transmitted portion. As a result, the quality and readability of color images and color videos in bright light conditions may suffer.

BRIEF DESCRIPTION OF THE DRAWINGS

Various embodiments of the present invention will herein after be described in conjunction with the appended drawings, provided to illustrate and not to limit the present invention, wherein like designations denote like elements, and in which.

DETAILED DESCRIPTION

1. General Overview

Figure 1:
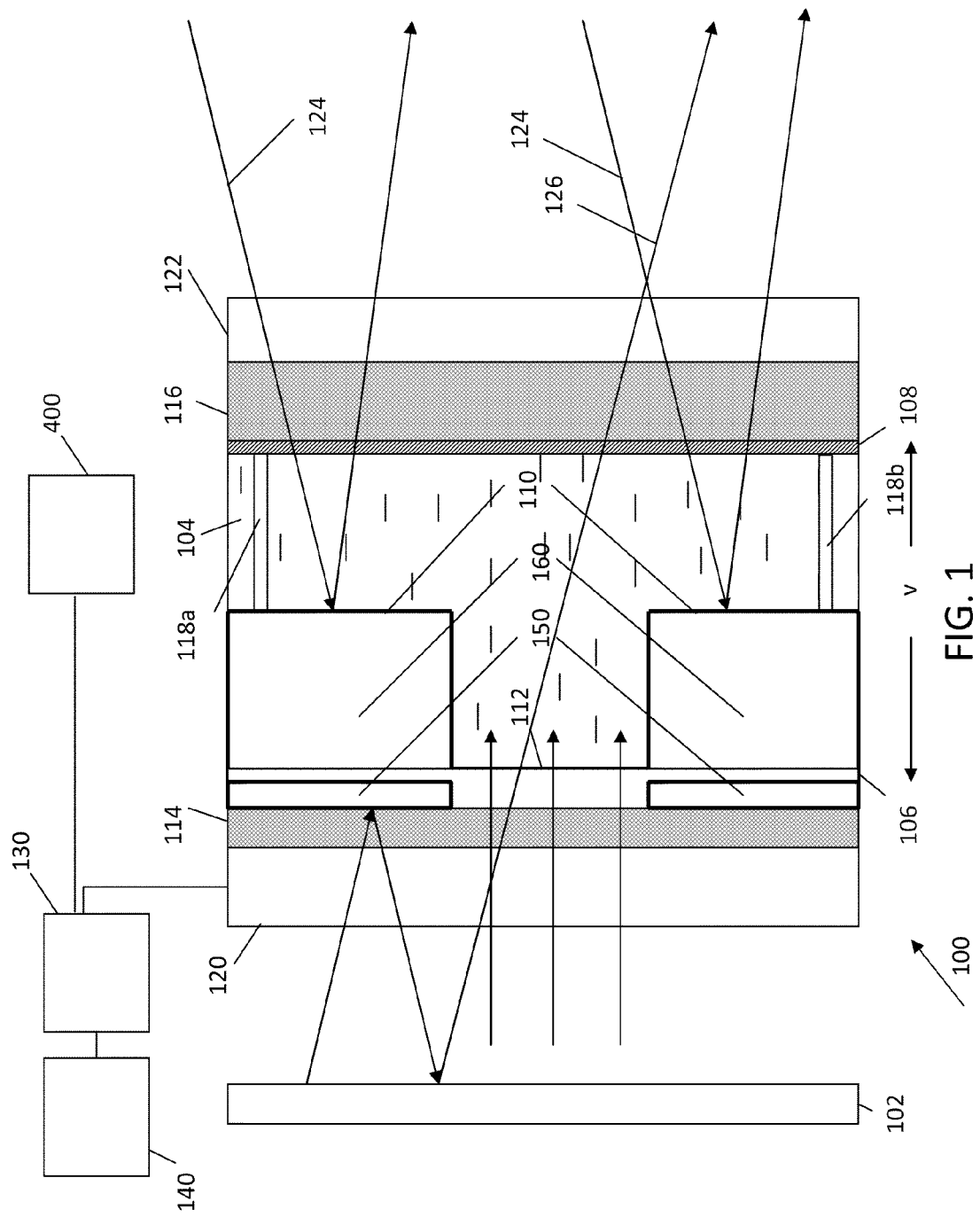
FIG. 1 is a schematic of a cross section of a pixel of a LCD.

In an embodiment, a triple mode LCD provides any color saturation in ambient illumination, a monochrome reflective mode, and a full color saturation transmissive mode.

In some embodiments, a multi-mode display system comprises a multi-mode liquid crystal display comprising a plurality of pixels. A pixel in the plurality of pixels comprises a transmissive part and a reflective part.

The multi-mode display system comprises a latched pixel driving circuit. The latched pixel driving circuit comprises a transmissive latching section comprising a transmissive data input coupled to the transmissive part of each pixel, which is configured to drive a transmissive data value from the transmissive data input and to set the transmissive part of the pixel to a transmissive display state based on the transmissive data value.

The latched pixel driving circuit comprises a reflective latching section comprising a reflective data input coupled to the reflective part of each pixel, and is configured to drive a reflective data value from the reflective data input and to set the reflective part of the pixel to a reflective display state based on the reflective data value.

In some embodiments, the transmissive data value is provided from a plurality of transmissive data values. The transmissive display state is from a plurality of transmissive display states. Similarly, the reflective data value is from a plurality of reflective data values. The reflective display state is from a plurality of reflective display states. The transmissive data input to a transmissive part of a pixel is independent of the reflective data input to a reflective part of the pixel. Each such data input may or may not be set to different values.

Based on a value from the plurality of reflective data values, a reflective part in a pixel may be configured to a black or non-black reflective display state. Based on a value from the plurality of transmissive data values, a transmissive part in a pixel may be configured to a black or non-black transmissive display state.

In some embodiments, the techniques applied to a pixel as described herein may be applied to or used with a sub-pixel. In the disclosure as a whole, the term "pixel" may correspond to a sub-pixel. For example, two or more pixels as described herein may form a single composite pixel as a basic picture element. In some of these embodiments, three pixels as described herein may be used as three sub-pixels, each of which is assigned to produce a different color. Thus, the three sub-pixels may be considered as a single composite pixel and a single picture element.

In an embodiment, the multi-mode display may operate in a transflective mode in which identical data input values are provided to both reflective and transmissive parts of a pixel.

In an embodiment, the reflective part of each pixel (or sub-pixel if so used) can be driven to an identical electrical field state (with an identical reflective data input value) such that the reflective part of each pixel appears black, while the transmissive part of each pixel can be driven by image data. Thus bright ambient lighting does not affect the color fidelity of the display.

In an embodiment, the multi-mode LCD as described herein forms a part of a computing device or other electronic apparatus, including but not limited to a laptop computer, notebook computer, ebook, cell phone, and netbook computer.

Various embodiments relate to a Liquid Crystal Display (LCD) that is capable of functioning in multi-mode, a monochrome reflective mode and a color transmissive mode. Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structural Overview

FIG. 1 is a schematic of a cross section of a pixel 100 of a LCD. Pixel 100 comprises a liquid crystal material 104, a pixel electrode (or a first electrode layer) 106 that includes switching elements, a common electrode (or a second electrode layer) 108, a first reflective layer 160 that is located on one side of electrode 106, a second reflective layer 150 that is located on the other side of the electrode 106, a transmissive part 112, first and second substrate layers 114 and 116, spacers 118a and 118b, a first polarization layer 120, and a second polarization layer 122.

In an embodiment, first and second reflective layers 160 and 150 have an opening over the transmissive part 112. A surface of first reflective layer 160 forms in part a reflective part 110. A surface of second reflective layer 150 may be used to reflect light incident from the left-hand side of the surface. In an embodiment, a light source 102 or an ambient light 124 illuminates pixel 100. Examples of light source 102 include, but are not limited to, Light Emitting Diodes backlights (LEDs), Cold-Cathode Fluorescent Lamps backlights (CCFLs), and the like. Ambient light 124 can be sunlight or any external source of light. In an embodiment, liquid crystal material 104, which is an optically active material, rotates the axis of the polarization of the light from light source 102 or ambient light 124. Liquid crystal 104 can be a Twisted Nematic (TN), an Electrically Controlled Birefringence (ECB) and the like. In an embodiment, the rotation of the polarization orientation of the light is determined by the potential difference applied between pixel electrode 106, and common electrode 108. In an embodiment, pixel electrode 106 and common electrode 108 can be made of Indium Tin Oxide (ITO). Further, each pixel is provided with a pixel electrode 106, while common electrode 108 is common to all the pixels present in the LCD.

In an embodiment, reflective part 110 is electrically conductive and reflects ambient light 124 to illuminate pixel 100. The first reflective layer 160 is made of metal and is electrically coupled to pixel electrode 106 thereby providing the potential difference between reflective part 110 and common electrode 108. Transmissive part 112 transmits light from light source 102 to illuminate pixel 100. Substrates 114 and 116 enclose liquid crystal material 104, pixel electrode 106 and common electrode 108. In an embodiment, pixel electrode 106 is located at substrate 114, and common electrode 108 is located at substrate 116. Additionally, substrate 114 and pixel electrode layer comprises switching elements (not shown in FIG. 1). In an embodiment, the switching elements can be Thin Film Transistors (TFTs). In another embodiment the switching elements can be low temperature polysilicon.

A driver circuit 130, which may be a part of or in addition to a latched pixel driving circuit 400, sends signals related to pixel values to the switching elements. In an embodiment, driver circuit 130 uses low voltage differential signaling (LVDS) drivers. In another embodiment, a transistor-transistor logic (TTL) interface that senses both increase and decrease in voltages is used in driver circuit 130. Additionally, a timing controller 140 encodes signals (e.g., transmissive data input values as previously described) related to pixel values into the signals needed by the transmissive parts of the pixels, and signals (e.g., reflective data input values as previously described) related to pixel values into the signals needed by the reflective parts of the pixels. Furthermore, timing controller 140 has a memory to allow self-refresh of the LCD when the signals related to the pixels are removed from timing controller 140.

In an embodiment, spacers 118a and 118b are placed over reflective part 110 to maintain a uniform distance between substrates 114 and 116. Additionally, pixel 100 comprises first polarizer 120 and second polarizer 122. In an embodiment, the axes of polarity of first polarizer 120 and second polarizer 122 are perpendicular to each other. In another embodiment, the axes of polarity of first polarizer 120 and second polarizer 122 are parallel to each other.

Pixel 100 is illuminated by light source 102 or ambient light 124. The intensity of light passing through pixel 100 is determined by the potential difference between pixel electrode 106, and common electrode 108. In an embodiment, liquid crystal material 104 is in a disoriented state and the light passing through first polarizer 120 is blocked by second polarizer 122 when no potential difference is applied between pixel electrode 106, and common electrode 108. Liquid crystal material 104 is oriented when the potential difference is applied between pixel electrode 106, and common electrode 108. The orientation of liquid crystal material 104 allows the light to pass through second polarizer 122.

In an embodiment, first reflective layer 160 is placed on one side of electrode 106, while second reflective layer 150 may be placed on the opposite side of electrode 106. The second reflective layer 150 may be made of metal, reflecting or bouncing light 126 (incident from the left-hand side of FIG. 1) one or more times until the light 126 transmits through the transmissive part 112 to illuminate pixel 100.

For the purpose of illustrating a clear example, straight lines indicate light path segments of lights 112, 124, 126. Each of the light path segments may comprise additional bending due to diffractions which may occur when lights 112, 124, 126 travel through junctions between media of different refractive indexes.

For the purpose of illustrating a clear example, the pixel 100 is illustrated with two spacers 118a and 118b. In various embodiments, two neighboring spacers may be placed one or more pixels apart, every ten pixels apart, every twenty pixels apart, every 100 pixels apart, or other distances apart.

3. Functional Overview

Figure 2:
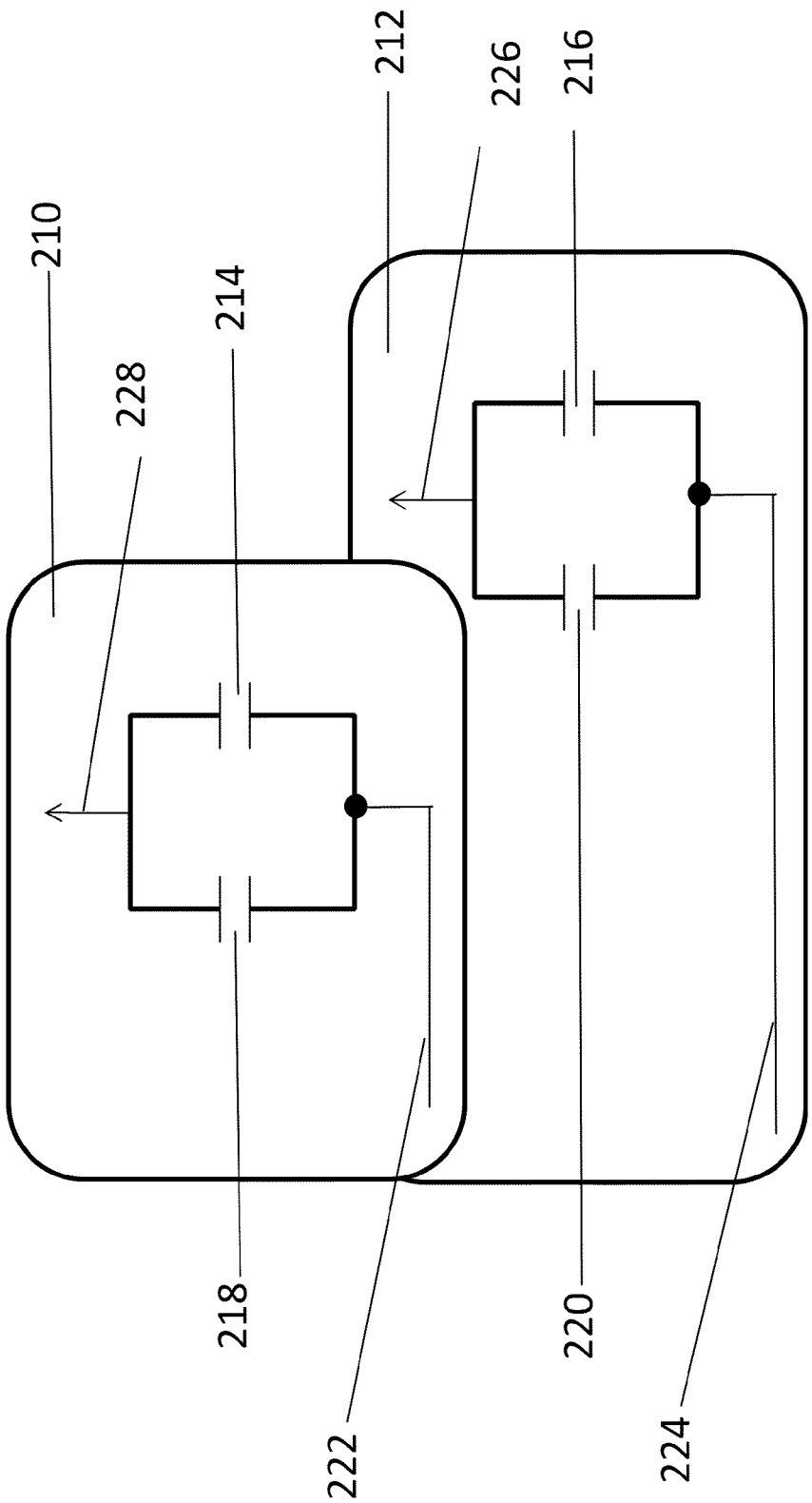
FIG. 2 illustrates a part of an example circuit driving a pixel via four capacitors.

FIG. 2 illustrates a part of an example circuit driving a pixel via four capacitors. Pixel 100 comprises transmissive part 112 and reflective part 110.

In an embodiment, the display state of transmissive part 112 can be controlled in part by a circuit portion 210 comprising first and second capacitors 214 and 218. In an embodiment, the first capacitor 214 is formed by two electrodes (or conductors) separated by a portion of the liquid crystal material in the transmissive part 112 and derives its capacitance from that portion of the liquid crystal material. In an embodiment, the second capacitor 218 is a storage capacitor that helps maintain the first capacitor in a stable charged state and may be formed in part by a portion of a thin film layer inserted into the pixel structure. In some embodiments, when the multi-mode LCD is operating in a monochromatic reflective mode, the first capacitor 214 may be placed in a charged state that makes the transmissive part 112 look dark black or appear at another specific brightness level. In such a charged state, a voltage of 0, 2.5, 5, or a different value, may be maintained over the portion of the liquid crystal material in the transmissive part 112 through the first and second capacitors 214 and 218. The first and second capacitors 214 and 218 are connected in parallel and may be connected to the same electric source or drain at points 222 and 228 in charging or discharging cycles.

In an embodiment, a display state of reflective part 110 can be controlled in part by a circuit portion 212 comprising third and fourth capacitors 216 and 220. In an embodiment, the third capacitor 216 is formed by two electrodes (or conductors) separated by a portion of the liquid crystal material in the reflective part 110 and derives its capacitance from that portion of the liquid crystal material. In an embodiment, the fourth capacitor 220 is a storage capacitor that helps maintain the third capacitor in a stable charged state and may be formed in part by another portion of the thin film layer inserted into the pixel structure. For example, in some embodiments, when the multi-mode LCD is operating in a monochromatic reflective mode, the third capacitor 216 may be placed in a charged state that makes the reflective part 110 look dark black or appear at another specific brightness level. In such a charged state, a voltage of 0, 2.5, 5, or a different value, may be maintained over the portion of the liquid crystal material in the reflective part 110 by the third and fourth capacitors 216 and 220. The third and fourth capacitors 216 and 220 are connected in parallel and may be connected to the same electric source or drain at points 224 and 226 in charging or discharging cycles.

Since the reflective part 110 and the transmissive part 112 are coupled respectively to separate capacitors, the latched pixel driving circuit 400 may use these separate capacitors to set the reflective part 110 and the transmissive part 112 to independent display states. For example, the reflective part 110 may be dark black by holding a particular voltage across the third capacitor 216, while the transmissive part 112 may be driven by image data to a specific color by holding a different voltage across the first capacitor that enables the reading of a pixel value from the image data. In a similar manner, the transmissive part 112 may be dark black while the reflective part 110 may be driven by image data to a specific shade of gray. Additionally and/or alternatively, the reflective part 110 and the transmissive part 112 may both be driven by the same image data by holding the capacitors to the same or different voltages in various embodiments.

Figure 3:
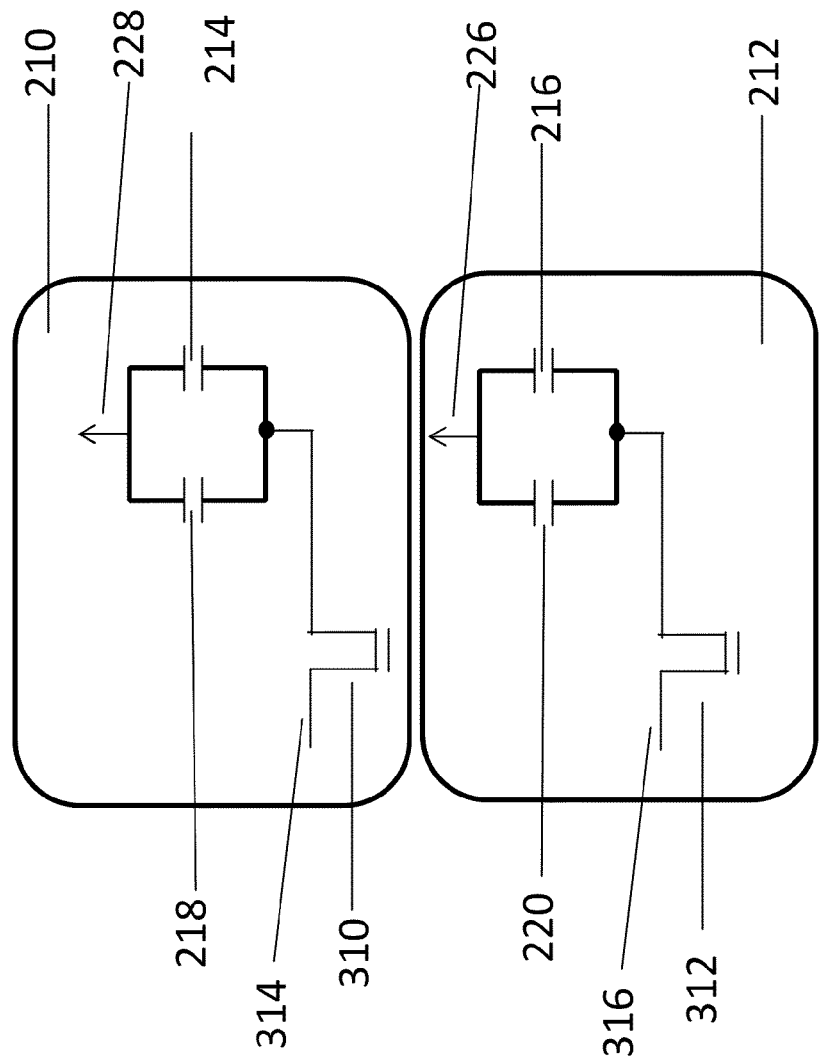
FIG. 3 illustrates a part of an example circuit driving a pixel via two transistors.

FIG. 3 illustrates a part of an example circuit driving a pixel using two transistors.

In an embodiment, the circuit portion 210 may further comprise a transistor 310 in addition to the first and second capacitors 214 and 218. One terminal of the capacitors 214 and 218 is connected to an electric source or drain through a junction 314 of the transistor 310. In some embodiments, the charging or discharging of the first and second capacitors 214 and 218 is controlled by applying different gate voltages to the transistor 310. For example, when the capacitors 214 and 218 should be charged or discharged, a gate voltage may be applied to the gate junction of the transistor 310 to enable the capacitors connected through the junction 314 to the electric source or drain over near zero, or very low, resistance. When the capacitors 214 and 218 should maintain their current charged state at a particular voltage level, a different gate voltage may be applied to the gate junction of the transistor 310 to cause the capacitors 214 and 218 to be effectively disconnected from the junction 314 or only connected over very high resistance in order to prevent or to slow charging or discharging of the capacitors 214 and 218.

In an embodiment, the circuit portion 226 may further comprise a transistor 312 in addition to the third and fourth capacitors 216 and 220. One terminal of the capacitors 216 and 220 is connected to an electric source or drain through a junction 316 of the transistor 312. In some embodiments, the charging or discharging of the third and fourth capacitors 216 and 220 can be controlled by applying different gate voltages to the transistor 312. For example, when the capacitors 216 and 220 should be charged or discharged, a gate voltage may be applied to the gate junction of the transistor 312 to enable the capacitors connected through the junction 316 to the electric source or drain over near zero, or very low, resistance. When the capacitors 216 and 220 should maintain their current charged state at a particular voltage level, a different gate voltage may be applied to the gate junction of the transistor 312 to cause the capacitors 216 and 220 to be effectively disconnected from the junction 316 or only connected over very high resistance in order to prevent or to slow charging or discharging of the capacitors 216 and 220.

As the reflective part 110 and the transmissive part 112 have respectively separate capacitors and transistors, the latched pixel driving circuit 400 may use these separate capacitors and transistors to set the reflective part 110 and the transmissive part 112 to independent display states in a manner similar to that previously described.

Figure 4:
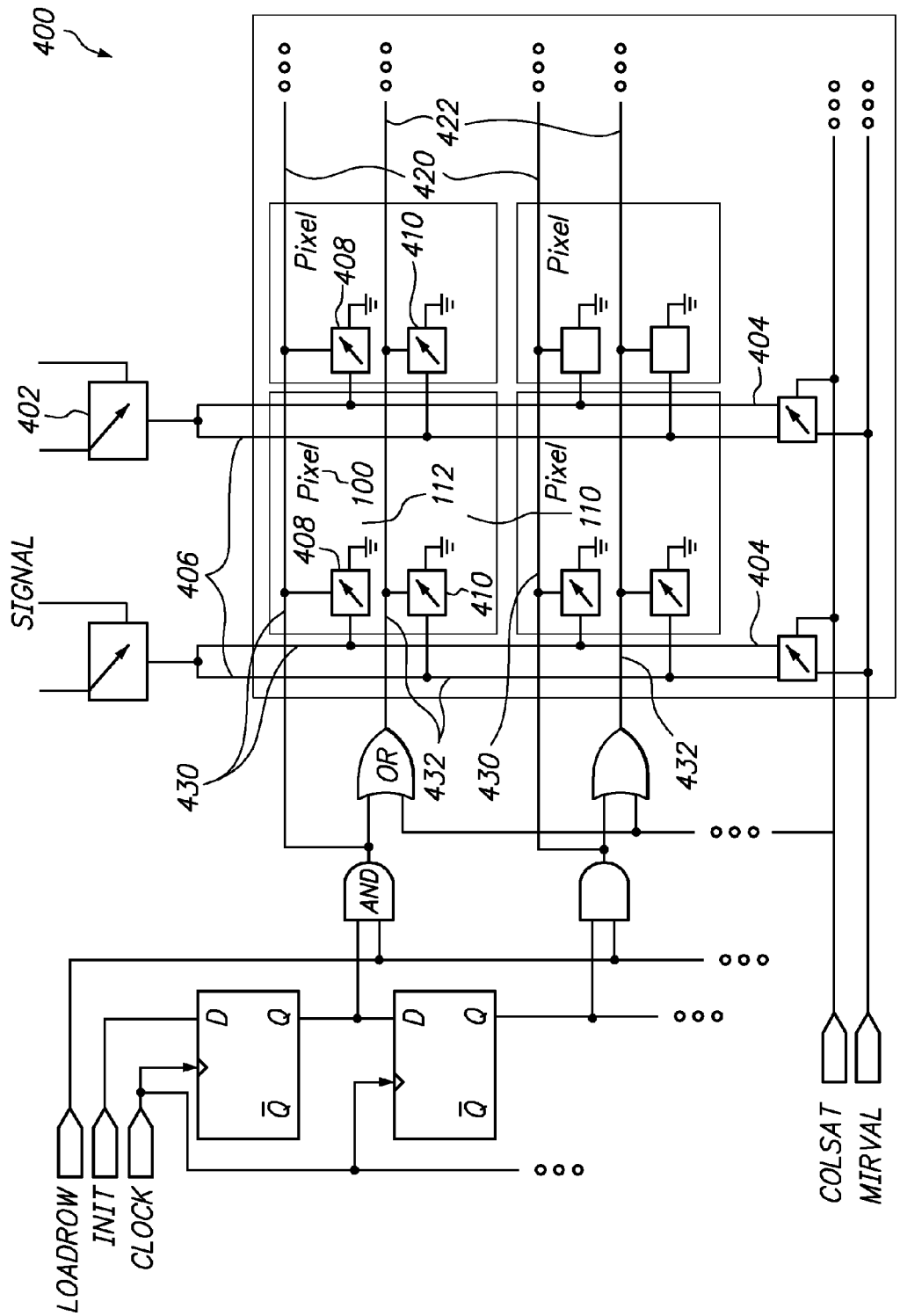
FIG. 4 illustrates an example latched pixel driving circuit.

FIG. 4 illustrates an example latched pixel driving circuit 400. In some embodiments, pixel values communicated using signal 402 that are generated based on image data can be provided to pixels through first circuit columns 404 and second circuit columns 406. Signals from first columns 404 drive transmissive switching elements 408 of the transmissive parts 112 of pixels such as pixel 100, while signals from second columns 406 are used to drive reflective switching elements 410 of the reflective parts 110 of pixels 100. In the transflective mode, the same signal 402 may be present on both columns 404 and 406 for the pixel 100. Thus, the switching elements 408 and 410 of the transmissive part 112 and the reflective part 110, respectively, may be driven by the same pixel value as carried by the signal 402.

In some embodiments, the latched pixel driving circuit 400 is used to drive the reflective switching elements 410 separately from the transmissive switching elements 408. The latched pixel driving circuit 400 may comprise a transmissive latching circuit section 430 and a reflective latching circuit section 432 logically (not necessarily physically as the two circuit sections may share common circuit elements). The transmissive latching circuit section comprises first rows 420, first columns 404, and circuit elements related to these rows and columns. The reflective latching circuit section comprises second rows 422, second columns 406, and circuit elements related to those rows and columns.

The first rows 420 may be configured to control the states of the transistors 310, the first capacitors 214, and the second capacitors 218 in the transmissive parts 112 of the pixels 100. For example, the first rows 420 may be configured to set the first capacitors 214 and the second capacitors 218 to a particular voltage and cause the transmissive switching elements 408 to ignore signals on the first columns 404. Based on this particular voltage, all the transmissive parts 112 may be set to a same display state.

Independently, the second rows 422 may be configured to control the states of the transistors 312, the third capacitors 216, and the fourth capacitors 220 in the reflective parts 110 of the pixels 100. For example, the second rows 422 may be configured to set the third capacitors 216 and the fourth capacitors 220 to a particular voltage and cause the reflective switching elements 410 to ignore signals on the second columns 406. Based on this particular voltage, all the reflective parts 110 may be set to a same display state.

For the purpose of illustrating a clear example, the latched pixel driving circuit 400 of FIG. 4 separately controls the reflective parts and the transmissive parts of pixels. Different latched pixel driving circuits and different configurations may be used. For example, instead of causing a switching element of a pixel to ignore a driving signal representing a pixel value (or a part thereof), a driving signal such as 402 may be a switched signal that can be switched off. Also, instead of using four capacitors and two transistors to help control the display states of the transmissive part and the reflective part of a pixel, different numbers or different types of electric elements may be used to place the transmissive part and the reflective part in separate display states. Thus, in various embodiments, these and other ways of separately controlling the reflective parts and the transmissive parts of pixels may be used.

The switching element of the reflective part 110 of each pixel 100 may receive a dedicated reflective data input in the form of data values inputted from a corresponding row and column combination, while the separate switching element of the transmissive part 112 of each pixel 100 may receive a separate dedicated transmissive data input in the form of separate data values inputted from a separate corresponding row and column combination.

The reflective data inputs from the latched pixel driving circuit 400 can drive the reflective switching elements with different reflective data values, causing the reflective switching elements to enter different reflective display states. In an embodiment, different reflective states relate to color value, shades of gray, or brightness. The same switching elements can also be driven by the same global reflective data value during a time interval, thereby causing the reflective parts to the same reflective display state substantially simultaneously based on the same global reflective data value. In this context, "substantially simultaneously" typically means less than 0.1 second.

The transflective data inputs from the latched pixel driving circuit 400 can drive the transflective switching elements with different transflective data values, thereby placing these transflective switching elements in different transflective display states relating to color value, shades of gray, or brightness. These same switching elements can also be driven by the same global transflective data value during a time interval, thereby causing the transflective parts to the same transflective display state substantially simultaneously based on the same global transflective data value.

Figure 5:
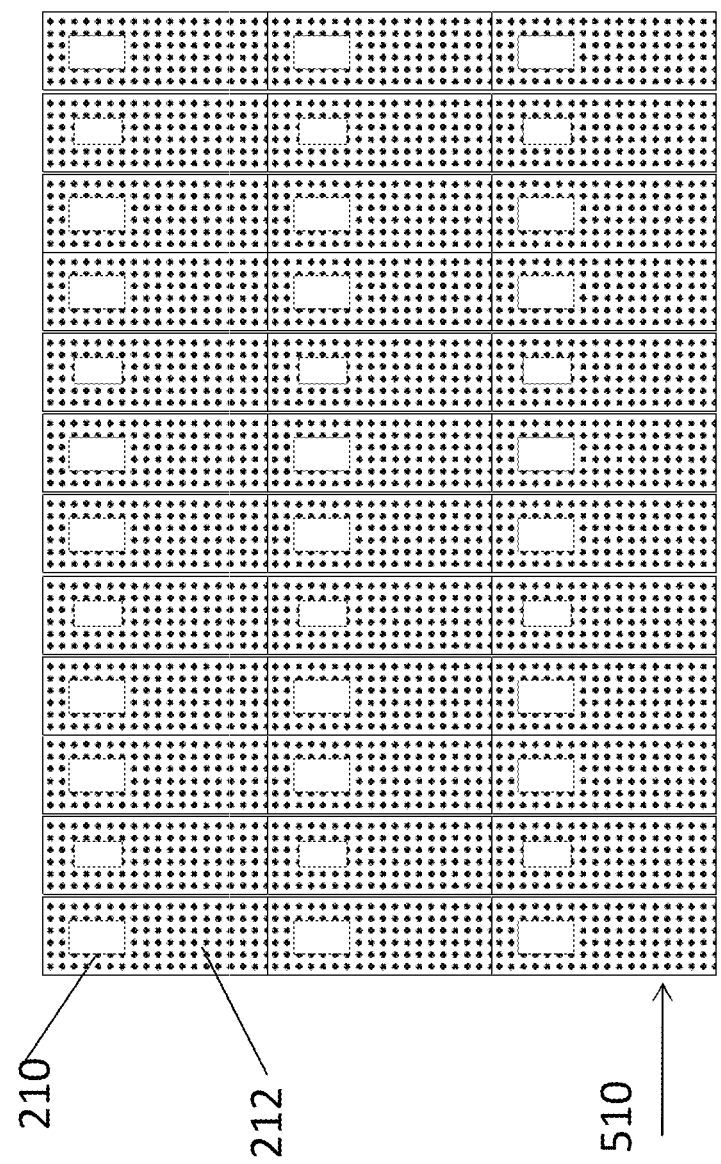
FIG. 5 illustrates an LCD in an example operating mode with the reflective portions of the pixels turned "off"

FIG. 5 illustrates an LCD 510 in an example operating mode with the reflective portions of the pixels turned off. An ambient light source 512 such as the sun may provide a bright light condition. If the LCD operates in a transflective mode, strong ambient light may cause severe color desaturation in the reflective parts 212 of the LCD 510. While the transmissive parts 210 of the LCD 510 may provide colors of appropriate color desaturation, the LCD 510 overall may present color images with poor fidelity, as affected by the severe color desaturation in the reflective parts 212 of the LCD 510. The multi-mode LCD 510 as described herein is able to control the reflective parts 212 separately from the transmissive parts 210. For example, the reflective parts 212 can be placed in an appropriate display state such as dark black, while the transmissive parts 210 can be used to generate images based on image data with high fidelity.

Figure 6:
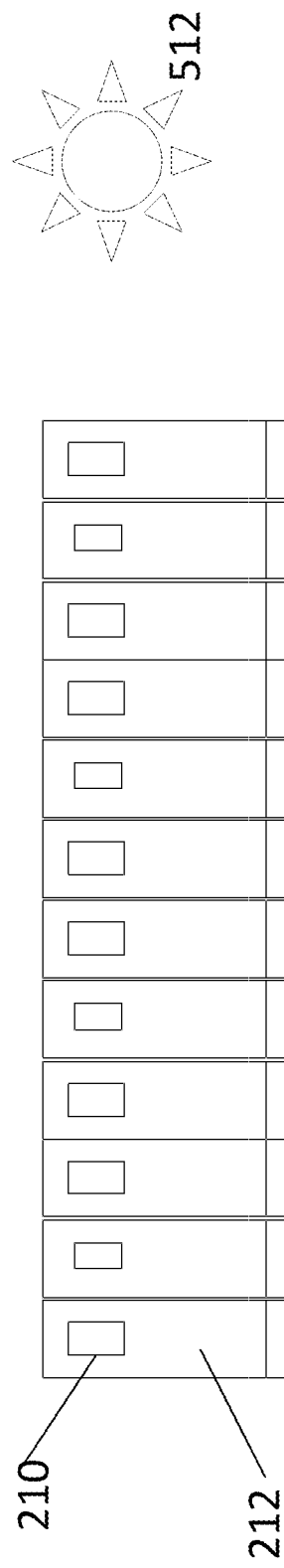
FIG. 6 illustrates an LCD in an example operating mode with the reflective portions driven identically to the transmissive portions of each pixel.

FIG. 6 illustrates an LCD 610 in an example operating mode with the reflective portions driven identically to the transmissive portions of each pixel, in various embodiments. The ambient light may be not so bright as to render color images severely desaturated. In these situations, ambient light from a source 512 such as the sun may provide additional light to illuminate the liquid crystal material in the LCD 610 through reflectance. The luminance from both a back light source and the ambient light may provide better quality images than without the ambient light. The multi-mode LCD 610 as described herein is able to control the reflective parts 212 separately from the transmissive parts 210. For example, the reflective parts 212 can be made to receive the same image data as that received by the transmissive parts 210. Both the reflective parts 212 and the transmissive parts 210 can be used to generate images based on the same image data with high fidelity.

4. Driving Signal Techniques

In some embodiments, a pixel 100 in a multi-mode LCD as described herein can be used in the color transmissive mode in the same manner as a sub-pixel in a standard color pixel. For example, three pixels 100 can form a single composite pixel and be electronically driven by a multi-bit signal representing a RGB value (for example, a 24-bit signal) to produce the specified red, green, and blue component colors in the composite pixel.

In some embodiments, a pixel 100 as described herein can be used as a black-and-white pixel in a black-and-white reflective mode. In some embodiments, three pixels 100 in a composite pixel of the multi-mode LCD can be individually, or alternatively collectively, electronically driven by a single 1-bit signal to produce either black or white in the pixels. In some embodiments, each of the pixels 100 in a composite pixel of the multi-mode LCD can be individually electronically driven by a different 1-bit signal to produce either black or white in each pixel 100. In these embodiments, power consumption is drastically reduced by (1) using 1-bit signals as compared with the multi-bit signals in the color transmissive mode and/or (2) using ambient light as a main source of the light. In addition, in the black-and-white reflective modes where each pixel 100 can be individually driven by a different bit value and each pixel 100 is an independent unit of display (or a picture element), the resolution of the LCD in these operating modes can be made as high as three times the resolution of the LCD operating in other modes in which a composite pixel comprising multiple pixels 100 is used as an independent unit of display.

In some embodiments, a pixel 100 as described herein can be used as a grayscale pixel (for example, in a 2-bit-, 4-bit-, or 6-bit-gray-level reflective mode). In some embodiments, three pixels 100 can form a single composite pixel of the multi-mode LCD and be collectively electronically driven by a single multi-bit signal to produce a shade of gray in the composite pixel. In some embodiments, each of the pixels 100 in a composite pixel of the multi-mode LCD can be individually electronically driven by a different multi-bit signal to produce a shade of gray in each pixel 100. Similar to the black-and-white reflective mode, in these embodiments of different gray-level reflective modes, power consumption may be drastically reduced by (1) using signals of a lower number of bits as compared with the multi-bit signals in the color transmissive mode and/or (2) using ambient light as a main source of the light. In addition, in the gray-level operating modes where each pixel 100 can be individually driven by a different bit value and each pixel 100 is an independent unit of display, the resolution of the LCD in these operating modes can be made as high as three times the resolution of the LCD in other operating modes in which a composite pixel comprising multiple pixels 100 is used as an independent unit of display.

In some embodiments, a signal may be encoded into the video signal that instructs a display driver what operating mode and what corresponding resolution to drive. A separate line may be used to inform the display to go into a low-power mode.

5. Low Field Rate Operations

In some embodiments, a low field rate may be used to reduce power consumption. In some embodiments, the driver IC, which may be a part of, or alternatively in addition to, the latched pixel driving circuit 400 described herein, for the multi-mode LCD may run with a slow liquid crystal and may comprise electronics that allow the electric charge to be held longer at a pixel. In some embodiments, metal layers 110, 150 of FIG. 1 and an oxide layer may operate as additional capacitors to hold the electric charge.

In some embodiments, a layer of liquid crystal material 104 having a high value of Δn, termed a thick LC material, may be used. For example, LC material with Δn=0.25 may be used. Such a thick liquid crystal may switch states with a low field rate, and may have a high voltage holding ratio and long life even at the slow switching frequency. In one embodiment, the 5 CB liquid crystal material commercially available from Merck may be used.

Figure 7:
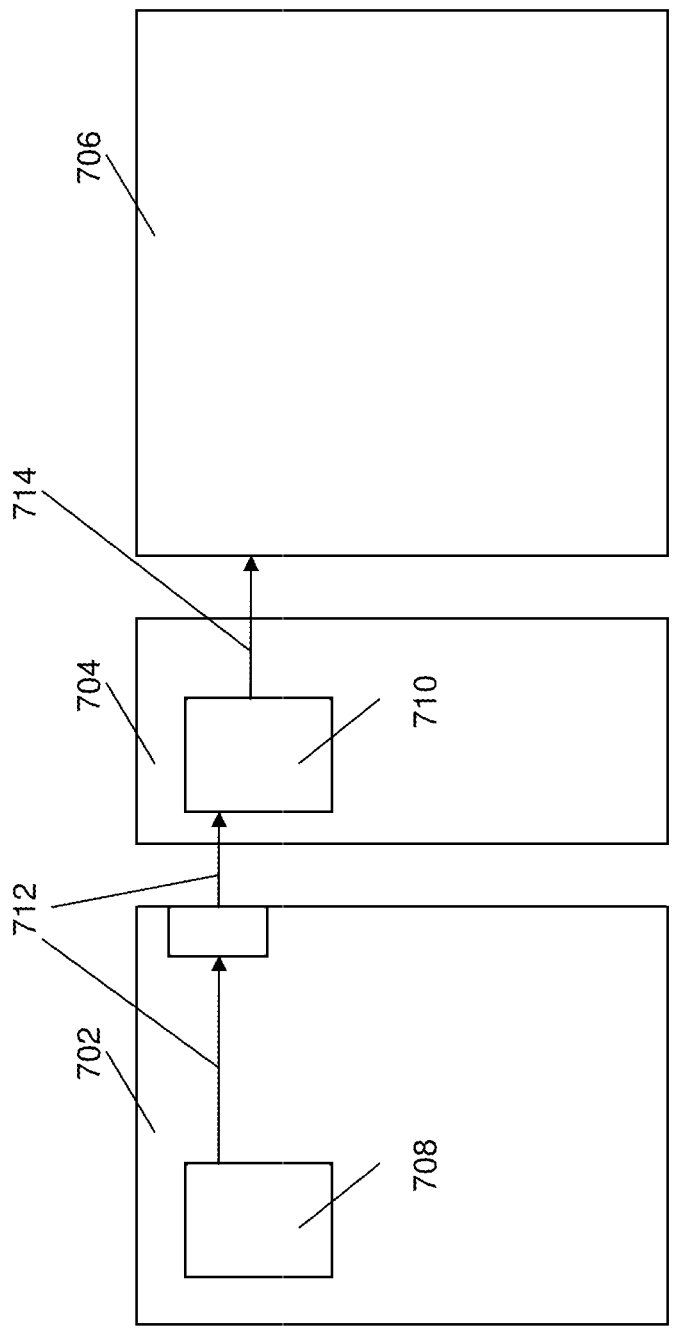
FIG. 7 is an example block diagram for an LCD with capability to operate in a low field rate mode.

FIG. 7 illustrates an example configuration in which a multi-mode LCD (706) runs at a low field rate without flicker. A chipset 702 that contains a CPU (or a controller) 708 may output a first timing control signal 712 to timing control logic 710, which may be a part, or in addition to, the latched pixel driving circuit 400 described herein, in a LCD driver IC 704. The timing control logic 710 in turn may output a second timing control signal 704 to the multi-mode LCD 706. In some embodiments, the chipset 702 may, but is not limited to, be a standard chipset that can be used to drive different types of LCD displays including the multi-mode LCD 706 as described herein.

In some embodiments, the driver IC 704 is interposed between the chipset 702 and the multi-mode LCD 706, and may contain specific logic to drive the multi-mode LCD in different operating modes. The first timing control signal 712 may have a first frequency such as 30 hz, while the second timing control signal 714 may have a second frequency in relation to the first frequency in a given operating mode of the multi-mode LCD. In some embodiments, the second frequency may be configured or controlled to be one half of the first frequency in the reflective mode. As a result, the second timing control signal 714 received by the multi-mode display 706 may be a smaller frequency than that for a standard LCD display in that mode. In some embodiments, the second frequency is regulated by the timing control logic 710 to have different relationships with the first frequency depending on the operating modes of the multi-mode LCD 706. For example, in the color transmissive mode, the second frequency may be the same as the first frequency. In some embodiments, the timing control signal 714 from the timing control logic 710 is of a frequency in a range of 10 hertz to 300 hertz, inclusive.

6. Extensions and Variations

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A multi-mode display system comprising:
a multi-mode liquid crystal display comprising a plurality of pixels, a first pixel in the plurality of pixels comprising a first transmissive part and a first reflective part;
a latched pixel driving circuit comprising:
a transmissive latching section comprising a first transmissive data input coupled to the first transmissive part of the first pixel, wherein the transmissive latching section is configured to drive a first transmissive data value from the first transmissive data input and to set the first transmissive part to a first transmissive display state based on the first transmissive data value from the first transmissive data input;
a reflective latching section comprising a first reflective data input coupled to the first reflective part of the first pixel, wherein the reflective latching section is configured to drive a first reflective data value from the first reflective data input and to set the first reflective part to a first reflective display state based on the first reflective data value from the first reflective data input;
wherein the first transmissive part comprises a first capacitor formed in part by a portion of a liquid crystal material in the first transmissive part; wherein the first transmissive part further comprises a second capacitor connected in parallel with the first capacitor and configured to maintain a charged state of the first capacitor; and wherein the first capacitor and the second capacitor are separate from the transmissive latching section.

2. The multi-mode display system according to claim 1, wherein the plurality of pixels includes a second and different pixel, comprising a second transmissive part and a second reflective part;
wherein the transmissive latching section is configured to drive a second transmissive data value from a second transmissive data input and to set the second transmissive part to a second transmissive display state based on the second transmissive data value from the second transmissive data input;
wherein the reflective latching section is configured to drive a second reflective data value from a second reflective data input and to set the second reflective part to a second reflective display state based on the second reflective data value from the second reflective data input;
wherein the second reflective data input is independent of the second transmissive data input.

3. The multi-mode display system according to claim 2, wherein the first reflective data input and the second reflective data input are configured to be driven to a same global reflective data value during a time interval and wherein the first reflective part and the second reflective part are configured to transition to a same reflective display state substantially simultaneously based on the same global reflective data value from the first reflective data input and the second reflective data input.

4. The multi-mode display system according to claim 2, wherein the first reflective data input is configured to be driven to a first non-global reflective data value during a time interval, wherein the second reflective data input is configured to be driven to a second, different non-global reflective data value during the time interval, wherein the first reflective part is configured to transition to a reflective display state in the time interval based on the first non-global reflective data value from the first reflective data input, and wherein the second reflective part is configured to transition to a different reflective display state in the time interval based on the second non-global reflective data value from the second reflective data input.

5. The multi-mode display system according to claim 2, wherein the first transmissive data input and the second transmissive data input are configured to be driven to a same global transmissive data value during a time interval and wherein the first transmissive part and the second transmissive part are configured to transition to a same transmissive display state substantially simultaneously based on the same global transmissive data value from the first transmissive data input and the second transmissive data input.

6. The multi-mode display system according to claim 2, wherein the first transmissive data input is configured to be driven to a first non-global transmissive data value during a time interval, wherein the second transmissive data input is configured to be driven to a second, different non-global transmissive data value during the time interval, wherein the first transmissive part is configured to transition to a transmissive display state in the time interval based on the first non-global transmissive data value from the first transmissive data input, and wherein the second transmissive part is configured to transition to a different transmissive display state in the time interval based on the second non-global transmissive data value from the second transmissive data input.

7. The multi-mode display system according to claim 2, wherein a single basic picture element comprises the first pixel, the second pixel and a third pixel; and wherein the third pixel comprises a third transmissive part and a third reflective part;
wherein the transmissive latching section is configured to drive a third transmissive data value from a third transmissive data input and to set the third transmissive part to a third transmissive display state based on the third transmissive data value from the third transmissive data input;
wherein the reflective latching section is configured to drive third reflective data value from a third reflective data input and to set the third reflective part to a third reflective display state based on the third reflective data value from the third reflective data input;
wherein the third reflective data input is independent of the first and second reflective data inputs
wherein the first, second and third reflective data inputs are capable of being driven to a same reflective data value.

8. The multi-mode display system according to claim 1, wherein the plurality of reflective data value comprises a particular reflective data value, and wherein a reflective part in a pixel of the plurality of pixels is configured to be in a black reflective display state in the plurality of reflective display state based on the particular reflective data value from a reflective data input.

9. The multi-mode display system according to claim 1, wherein the plurality of reflective data value comprises a particular reflective data value, and wherein a reflective part in a pixel of the plurality of pixels is configured to be in a non-black reflective display state in the plurality of reflective display state based on the particular reflective data value from a reflective data input.

10. The multi-mode display system according to claim 1, wherein the plurality of transmissive data value comprises a particular transmissive data value, and wherein a transmissive part in a pixel of the plurality of pixels is configured to be in a black transmissive display state in the plurality of transmissive display state based on the particular transmissive data value from a transmissive data input.

11. The multi-mode display system according to claim 1, wherein the plurality of transmissive data value comprises a particular transmissive data value, and wherein a transmissive part in a pixel of the plurality of pixels is configured to be in a non-black transmissive display state in the plurality of transmissive display state based on the particular transmissive data value from a transmissive data input.

12. The multi-mode display system according to claim 1, wherein the first capacitor and the second capacitor are configured to transition to the charged state based on the first transmissive data value from the first transmissive data input.

13. The multi-mode display system according to claim 1, wherein the first reflective part comprising a portion of a liquid crystal material, a third capacitor, and a fourth capacitor formed in part by the portion of the liquid crystal material, and wherein the third capacitor and the fourth capacitor are configured to transition to a charged state based on the first reflective data value from the first reflective data input.

14. The multi-mode display system according to claim 1, wherein the plurality of transmissive data values includes a plurality of intensity values for a specific color.

15. The multi-mode display system according to claim 1, wherein the plurality of reflective data values includes a plurality of values for different shades of gray including black and white.

16. The multi-mode display system according to claim 1, wherein the first pixel is coupled to a timing control circuit, wherein the first transmissive part comprising a first pair of electrode layers and a first portion of the liquid crystal layer between the first pair of electrodes, wherein the first reflective part comprising a second pair of electrode layers and a second portion of the liquid crystal layer between the second pair of electrodes, and wherein the first pair of electrodes and the second pair of electrodes are configured to be refreshed based on a timing control signal from the timing control circuit.

17. The multi-mode display system according to claim 1, wherein the timing control signal from the timing control circuit is of a frequency in a range of 10 hertz to 300 hertz, inclusive.

18. The multi-mode display system according to claim 1, wherein two or more pixels in the plurality of pixels form a single composite pixel as a basic picture element.

19. A computer, comprising:
one or more processors;
a multi-mode display system coupled to the one or more processors and comprising:
a multi-mode liquid crystal display comprising a plurality of pixels, a first pixel in the plurality of pixels comprising a first transmissive part and a first reflective part;
a latched pixel driving circuit comprising:
a transmissive latching section comprising a first transmissive data input coupled to the first transmissive part of the first pixel, wherein the transmissive latching section is configured to drive a first transmissive data value from the first transmissive data input and to set the first transmissive part to a first transmissive display state based on the first transmissive data value from the first transmissive data input;
a reflective latching section comprising a first reflective data input coupled to the first reflective part of the first pixel, wherein the reflective latching section is configured to drive a first reflective data value from the first reflective data input and to set the first reflective part to a first reflective display state based on the first reflective data value from the first reflective data input;
wherein the first transmissive part comprises a first capacitor formed in part by a portion of a liquid crystal material in the first transmissive part; wherein the first transmissive part further comprises a second capacitor connected in parallel with the first capacitor and configured to maintain a charged state of the first capacitor; and wherein the first capacitor and the second capacitor are separate from the transmissive latching section.

20. The computer according to claim 19, wherein the plurality of pixels includes a second and different pixel, comprising a second transmissive part and a second reflective part;
wherein the transmissive latching section is configured to drive a second transmissive data value from a second transmissive data input and to set the second transmissive part to a second transmissive display state based on the second transmissive data value from the second transmissive data input;
wherein the reflective latching section is configured to drive a second reflective data value from a second reflective data input and to set the second reflective part to a second reflective display state based on the second reflective data value from the second reflective data input;
wherein the second reflective data input is independent of the second transmissive data input.

21. The computer according to claim 20, wherein the first reflective data input and the second reflective data input are configured to be driven to a same global reflective data value during a time interval and wherein the first reflective part and the second reflective part are configured to transition to a same reflective display state substantially simultaneously based on the same global reflective data value from the first reflective data input and the second reflective data input.

22. The computer according to claim 20, wherein the first reflective data input is configured to be driven to a first non-global reflective data value during a time interval, wherein the second reflective data input is configured to be driven to a second, different non-global reflective data value during the time interval, wherein the first reflective part is configured to transition to a reflective display state in the time interval based on the first non-global reflective data value from the first reflective data input, and wherein the second reflective part is configured to transition to a different reflective display state in the time interval based on the second non-global reflective data value from the second reflective data input.

23. The computer according to claim 20, wherein the first transmissive data input and the second transmissive data input are configured to be driven to a same global transmissive data value during a time interval and wherein the first transmissive part and the second transmissive part are configured to transition to a same transmissive display state substantially simultaneously based on the same global transmissive data value from the first transmissive data input and the second transmissive data input.

24. The computer according to claim 20, wherein the first transmissive data input is configured to be driven to a first non-global transmissive data value during a time interval, wherein the second transmissive data input is configured to be driven to a second, different non-global transmissive data value during the time interval, wherein the first transmissive part is configured to transition to a transmissive display state in the time interval based on the first non-global transmissive data value from the first transmissive data input, and wherein the second transmissive part is configured to transition to a different transmissive display state in the time interval based on the second non-global transmissive data value from the second transmissive data input.

25. The computer according to claim 19, wherein a single basic picture element comprises the first pixel, the second pixel and a third pixel; and wherein the third pixel comprises a third transmissive part and a third reflective part;
wherein the transmissive latching section is configured to drive a third transmissive data value from a third transmissive data input and to set the third transmissive part to a third transmissive display state based on the third transmissive data value from the third transmissive data input;
wherein the reflective latching section is configured to drive third reflective data value from a third reflective data input and to set the third reflective part to a third reflective display state based on the third reflective data value from the third reflective data input;
wherein the third reflective data input is independent of the first and second reflective data inputs
wherein the first, second and third reflective data inputs are capable of being driven to a same reflective data value.

26. The computer according to claim 19, wherein the plurality of reflective data value comprises a particular reflective data value, and wherein a reflective part in a pixel of the plurality of pixels is configured to be in a black reflective display state in the plurality of reflective display state based on the particular reflective data value from a reflective data input.

27. The computer according to claim 19, wherein the plurality of reflective data value comprises a particular reflective data value, and wherein a reflective part in a pixel of the plurality of pixels is configured to be in a non-black reflective display state in the plurality of reflective display state based on the particular reflective data value from a reflective data input.

28. The computer according to claim 19, wherein the plurality of transmissive data value comprises a particular transmissive data value, and wherein a transmissive part in a pixel of the plurality of pixels is configured to be in a black transmissive display state in the plurality of transmissive display state based on the particular transmissive data value from a transmissive data input.

29. The computer according to claim 19, wherein the plurality of transmissive data value comprises a particular transmissive data value, and wherein a transmissive part in a pixel of the plurality of pixels is configured to be in a non-black transmissive display state in the plurality of transmissive display state based on the particular transmissive data value from a transmissive data input.

30. The computer according to claim 19, wherein the first capacitor and the second capacitor are configured to transition to the charged state based on the first transmissive data value from the first transmissive data input.

31. The computer according to claim 19, wherein the first reflective part comprising a portion of a liquid crystal material, a third capacitor, and a fourth capacitor formed in part by the portion of the liquid crystal material, and wherein the third capacitor and the fourth capacitor are configured to transition to a charged state based on the first reflective data value from the first reflective data input.

32. The computer according to claim 19, wherein the plurality of transmissive data values includes a plurality of intensity values for a specific color.

33. The computer according to claim 19, wherein the plurality of reflective data values includes a plurality of values for different shades of gray including black and white.

34. The computer according to claim 19, wherein the first pixel is coupled to a timing control circuit, wherein the first transmissive part comprising a first pair of electrode layers and a first portion of the liquid crystal layer between the first pair of electrodes, wherein the first reflective part comprising a second pair of electrode layers and a second portion of the liquid crystal layer between the second pair of electrodes, and wherein the first pair of electrodes and the second pair of electrodes are configured to be refreshed based on a timing control signal from the timing control circuit.

35. The computer according to claim 19, wherein the timing control signal from the timing control circuit is of a frequency in a range of 10 hertz to 300 hertz, inclusive.

36. The computer according to claim 19, wherein two or more pixels in the plurality of pixels form a single composite pixel as a basic picture element.

* * * * *